(12) United States Patent
Kotani et al.

(10) Patent No.: US 6,347,180 B1
(45) Date of Patent: Feb. 12, 2002

(54) SIGNAL PROCESSOR

(75) Inventors: Hiroki Kotani, Tokyo; Keiko Abe, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/194,897

(22) PCT Filed: Apr. 6, 1998

(86) PCT No.: PCT/JP98/01581

§ 371 Date: Dec. 4, 1998

§ 102(e) Date: Dec. 4, 1998

(87) PCT Pub. No.: WO98/46021

PCT Pub. Date: Oct. 15, 1998

(30) Foreign Application Priority Data

Apr. 6, 1997 (JP) .............................................. 9-103870

(51) Int. Cl.[7] ................................................. H04N 5/92
(52) U.S. Cl. .......................... 386/52; 386/64; 386/112; 386/125
(58) Field of Search ............................. 386/46, 52, 95, 386/96, 112, 109, 104, 121, 125, 126, 64; H04N 5/92

(56) References Cited

U.S. PATENT DOCUMENTS 5,164,839 A * 11/1992 Lang ........................... 386/104
5,488,433 A * 1/1996 Washino et al. ............... 386/52
5,546,191 A * 8/1996 Hibi et al. ..................... 386/95
5,915,069 A * 6/1999 Nishijima .................... 386/112

FOREIGN PATENT DOCUMENTS

| JP | 7-236110 | 9/1995 |
| JP | 9-070011 | 3/1997 |
| JP | 9-083867 | 3/1997 |

* cited by examiner

*Primary Examiner*—Huy Nguyen
(74) *Attorney, Agent, or Firm*—Jay H. Maioli (57) ABSTRACT

Inputted video signals are highly compressed in a high-compression processing means and the compressed signals are saved in a high-compression system processing means, and the video signals lowly compressed in a low-compression processing means and the compressed signals are saved in a first and a second recording means with separating them according to using frequency. The saved videos in the high-compression system processing means are edited and an executing sequence list showing their executing sequence is formed, and a video signal having a high using frequency is outputted from the first memory means which has a small storage capacity (thus, easily accessible), based on the executing sequence list.

6 Claims, 6 Drawing Sheets

SIGNAL PROCESSOR

FIELD OF THE ART

The present invention relates to a signal processing unit, and is applicable to a news program producing broadcasting system for example.

BACKGROUND ART

Figure 1:
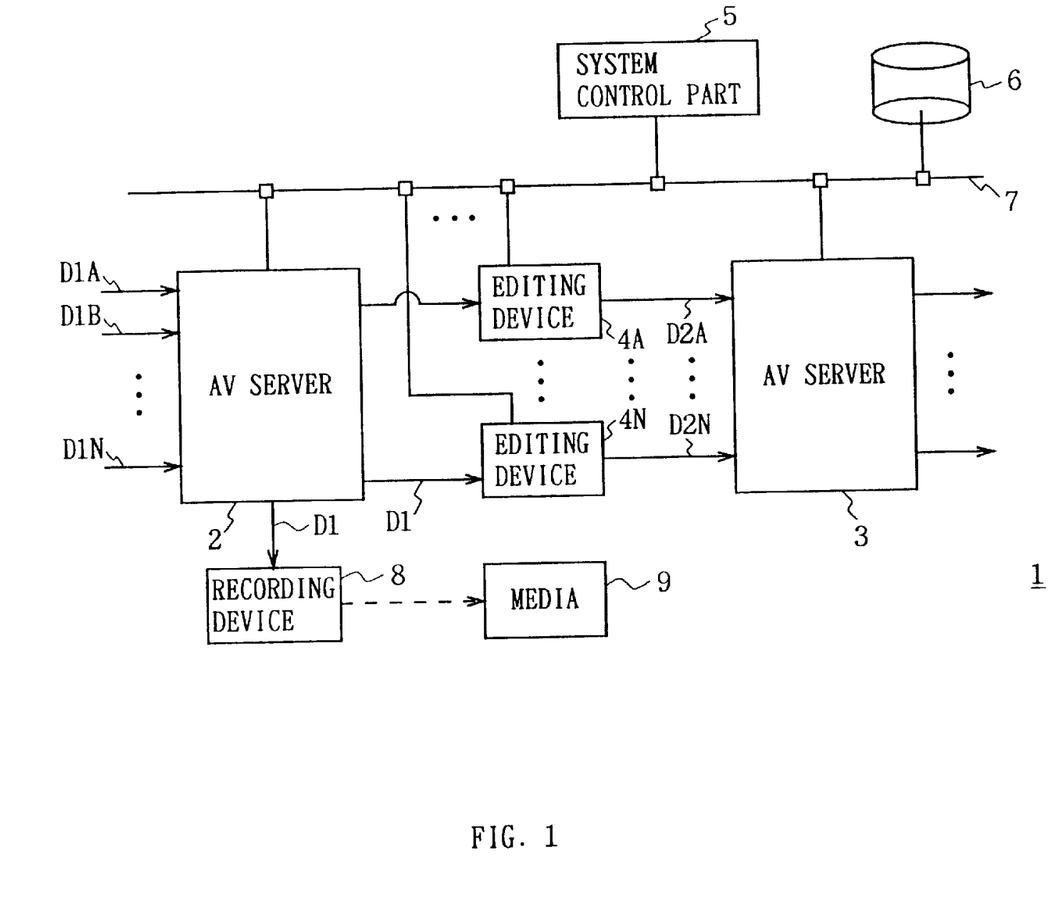
FIG. 1 is a block diagram showing a conventional news program producing and broadcasting system.

Heretofore, there is one constructed as shown in FIG. 1 an example of news program producing and broadcasting system in a broadcasting station.

In the news program producing and broadcasting system 1 having the above structure, a first and a second audio video (AV) servers 2 and 3 for recording and reproducing audio video (AV) data to/from a hard-disk drive (HDD) formed in array, plural editing devices 4A to 4N, a system control part 5 for controlling the entire system 1, and a data memory unit 6 in which various data is stored are connected to each other via a network 7. Then, not-compressed/lowly-compressed video audio data D1A to D1N transferred from the scene of gathering materials via a transmission line or reproduced from a material tape is supplied to the first AV server 2 via plural systems.

At this time, the first AV server 2 takes in video audio data D1 (D1A to D1N) specified by control of the system control part 5 from the supplied video audio data D1A to D1N simultaneously in the plural systems, filing the video data D1, and stores it to a specified address position of a recording/reproducing part.

Then, video audio data D1 of each file stored in this first AV server 2 can be simultaneously read out from the above first AV server 2 using the editing devices 4A to 4N respectively, and video images based on thus read-out video audio data D1 can be monitor-displayed in the editing devices 4A to 4N.

Furthermore, the operator can form a list for prescribing an editing executing sequence reading how the video audio data D1 is processed and edited to form a news video for broadcasting (hereinafter, this is referred to as EDL (edit decision list)) while viewing and confirming the monitor-displayed video images in the editing devices 4A to 4N, register the above formed EDL in the editing devices 4A to 4N and execute this.

Practically, the editing devices 4A to 4N read out necessary video audio data D1, process and edit this based on the EDL, and transmit video audio data D2A to D2N obtained by this editing processing to a second server 3 by controlling the first AV server 2 when in executing the EDL.

At this time, the second AV server 3 sequentially takes in the edited video audio data D2A to D2N by the control of the system control part 5, files this, and stores it to a specified address position in the recording/reproducing part.

Then, the video audio data D2A to D2N held in this second AV server 3 are reproduced and extended at a demanded time by the control of the system control part 5, and transmitted to an external on-air system (which is not shown in FIG.) and broadcasted via the above on-air system based on management information in the data memory unit 6.

In this manner, in this news program producing and broadcasting system 1, the video audio data D1A to D1N obtained by covering can be edited into desired states and broadcasted at a predetermined time.

Here, the AV server 2 of the news program producing and broadcasting system 1 is limited in recording capacity. Thus, the video audio data D1 stored in the AV server 2 (hereinafter, this is referred to as news material) is transmitted to the recording unit 8 by an operation by the user, and stored in portable recording media (removable media) 9. Then, the news material already recorded to the above recording media 9 left in the AV server 2 are deleted, so that the AV server 2 limited in capacity is effectively utilized.

By the way, since the news material recorded in the recording media 9 and made to be savable is deleted on the AV server 2, in the case where the above news material is used, the recording media 9 are needed to be reproduced by predetermined reproducing devices.

In this case, the recording media 9 are accommodated in a predetermined rack or the like along with plural recording media, and it is needed to be searched from the above rack and loaded into the reproducing device. Thus, the processing procedure, such that a problems and a time for preparing reproducing noticeably increase, is largely different from the case of reproducing a news material stored in the AV server 2, and it causes a problem that an operational efficiency lowers for the entire news program producing and broadcasting system.

As one method to solve this problem, a method for storing mass news materials by increasing the recording capacity of the AV server 2 is considered. However, according to this method, a configuration of the AV server 2 which is formed by a fixed disk device having an accurate structure becomes more complicated, and it causes a problem that its cost becomes noticeably high, therefore, it is insufficient as a solution.

DISCLOSURE OF INVENTION

Considering the above points, the present invention provides a video signal processing unit having a simple structure, promptly usable news material, and capable of realizing to share a news material file commonly used in each program.

To solve the above problems, a video processing unit according to the present invention, in a signal processing unit having a high-compression system processing means for highly compressing signals including video signals and saving them and a low-compression system processing means for not compressing or lowly compressing the signals including the video signals and saving them, comprises a first memory means for storing the signal including the video signal and a second memory means for storing the signal including the video signal having a lower using frequency than the first memory means.

Furthermore, in a video signal processing unit according to the present invention, in a signal processing unit having a high-compression processing means for highly compressing input signals including video signals and processing them and a low-compression processing means for not compressing or lowly compressing the input signals including the video signals and processing them, the high-compression processing means has a first memory means for storing the signal including the highly-compressed video signal and a list forming means for editing the signal stored in the first memory means and forming a list showing an executing sequence of the edited signal, and the low-compression processing means has a second memory means for storing the signal including not-compressed and lowly-compressed video signal, a list executing means for outputting the signal stored in the second memory mean based on the list formed by the list forming means and a third memory means for storing the signal outputted from the list executing means, and the low-compression processing means further has a fourth memory means for storing the signal stored in the second memory means according to the using frequency of the signal stored in the second memory means, and the signal stored in the third memory means is outputted.

According to the present invention, in a signal processing unit having a high-compression system processing means for highly compressing signals including video signals and saving them and a low-compression system processing means for not compressing or lowly compressing the signals including the video signals and saving them, the low-compression system processing means is provided with a first memory means for storing the signal including the video signal and a second memory means for storing the signal including the video signal having a lower using frequency than the first memory means. The storage capacity can be increased for the entire low-compression system memory means including the first memory means and the second memory means without increasing the storage capacity of the first memory means for storing the signal including the video signal having a high using frequency. Thus, an access to the first memory means for storing the signal including the video signal having a high using frequency can be facilitated.

DETAILED DESCRIPTION OF THE PREFERRED EMBODIMENT

Figure 2A:
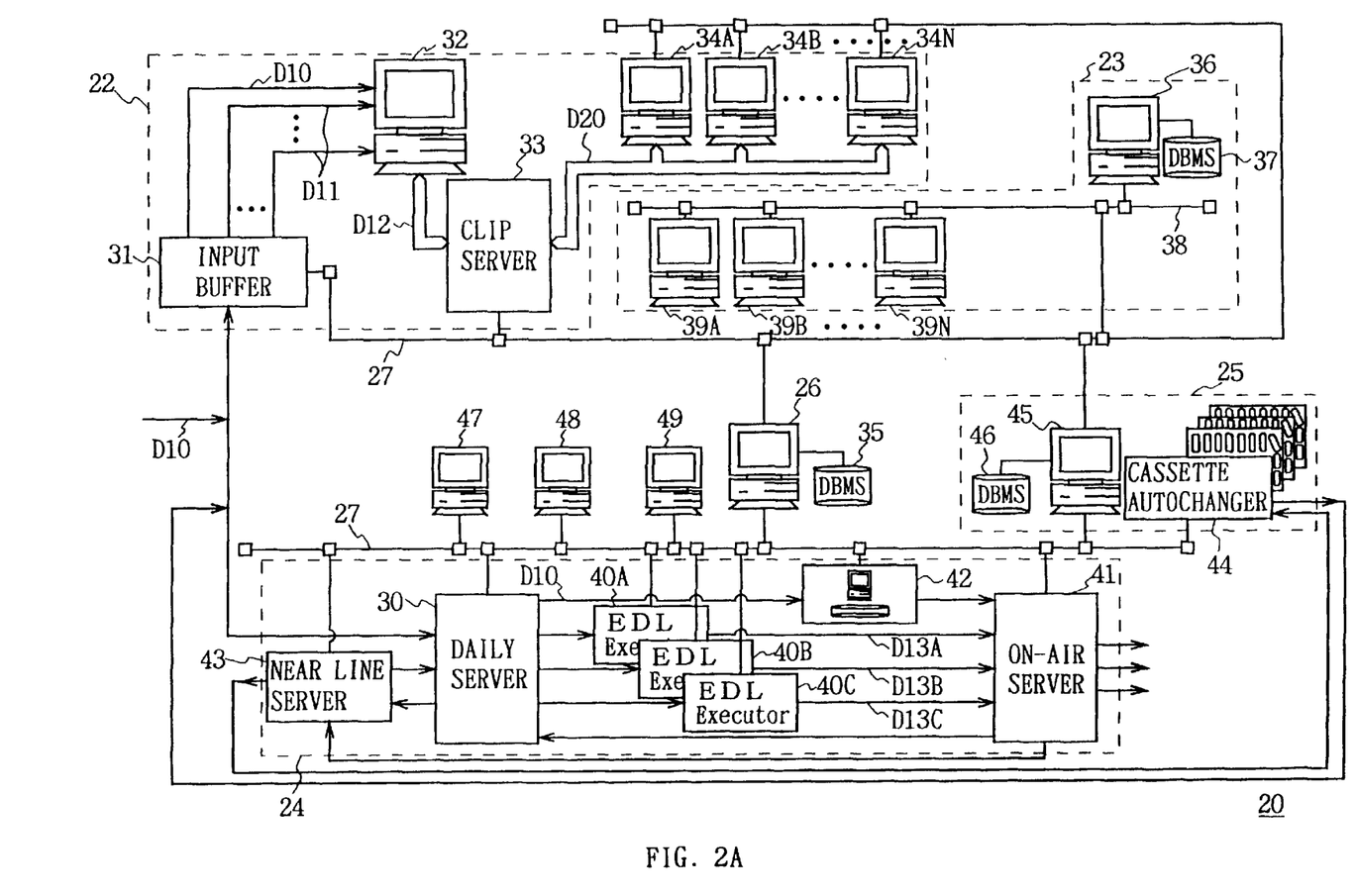
FIGS. 2A and 2B are block diagrams showing a news program producing and broadcasting system using a video signal processing unit according to the present invention.
Figure 2B:
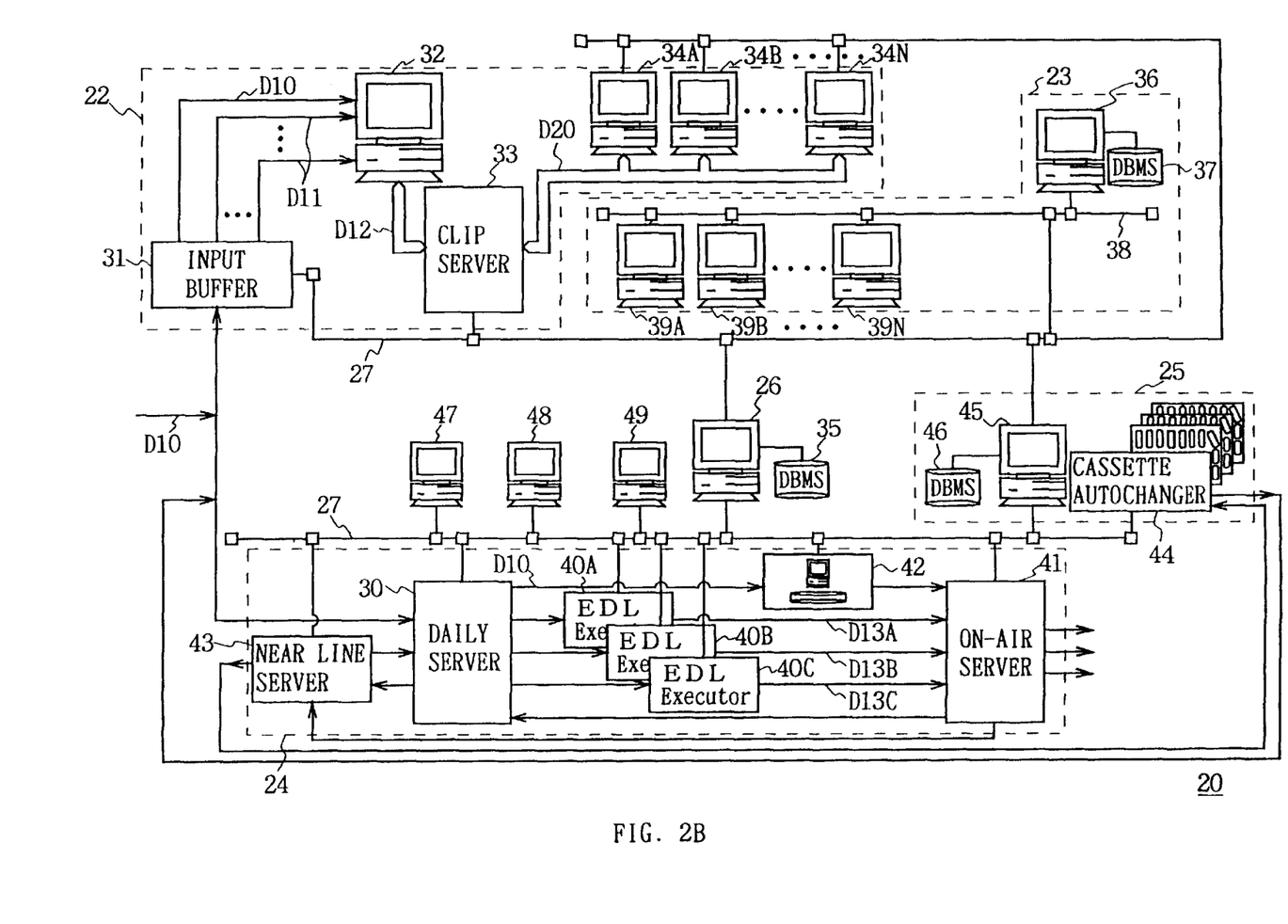

Hereinafter, an embodiment of the present invention will be described in detail with reference to the drawings.
(1) Construction of News Program Producing and Broadcasting System FIGS. 2A and 2B show generally a news program producing and broadcasting system applying the present invention. The system 20 is composed of an off-line EDL forming system 22 for forming an edit decision list (EDL; list prescribing of editing executing sequence), an on-air list forming system 23 for forming a list prescribing output time of each video audio data processed and edited (hereinafter, this is referred to as on-air list), a news original, and using sequence of this news original, etc., an on-line editing output system 24 for executing editing processing based on the EDL formed in the off-line EDL forming system 22, an archive 25 for saving necessary video audio data, and a system control part 26 for controlling the whole of this news program producing and broadcasting system 20. The off-line EDL forming system 22, on-air list forming system 23, on-line edition output system 24, archive 25, and system control part 26 are connected to each other via a local area network (LAN) 27.

To this news program producing and broadcasting system 20, data D10 including video and/or audio data transferred from the scene to collect data via transmission line such as a telephone line or a satellite communication line or the like, or video and/or audio data reproduced from a material tape by a video tape recorder is supplied via plural systems, and this data is inputted to a daily server 30 in the on-line edition output system 24 and an input buffer 31 in the off-line EDL forming system 22. Note that, in the description hereinafter, it is defined that each AV data D10 is supplied in the state where it is not compressed or lowly compressed (e.g., moving picture experts group (MPEG) 2 or 4:2:2P@ML (ITU-R advice).

The daily server 30 is mainly composed of a recording/reproducing part for recording/reproducing the AV data D10 to/from a non-linear accessible recording medium formed of an HDD having an array structure, and a dedicated compressively extending part represented in the MPEG2. It is available for high-speed data input/output, and simultaneously takes in the AV data D10 specified from among supplied plural AV data D10 under the control of the system control part 26, files the data respectively and stores it in a specified address position in the recording/reproducing part. The AV data D10 to be inputted to the daily server 30 is practically plural inputs, but FIG. 2 shows the case of one input for the simplification of description. Of course, one input is acceptable.

On the other hand, the input buffer 31 sequentially takes in the AV data D10 having the same system as the daily server 30 from among each supplied AV data D10 under the control of the system control part 26. Then, the input buffer 31 time-divides the above AV data D10 into plural channels in the case where this taken-in AV data D10 is at a high speed, and at the same time, extending the AV data D10 of each channel to a real time respectively, and thus obtained AV data D11 of each channel is transmitted to an encoder part 32 respectively. Furthermore, if this taken-in AV data D10 is at a real-time speed, the above AV data D10 is transmitted to the encoder part 32 as it is.

The encoder part 32 sequentially takes in each supplied AV data D11 (or D10), high-compressively codes this so that a transfer rate is to be 2 [Mbps] degree by a prescribed compressing system such as a joint photographic experts group (JPEG) system or the like, and transmits thus obtained high-compression coded data D12 to a clip server 33.

The clip server 33 has a recording/reproducing part for recording/reproducing the high-compression coded data D12 to a non-linear accessible recording medium which has almost the same construction as the aforementioned daily server 30 and is formed of an HDD in array structure. The clip server 33 sequentially takes in inputted high-compressively-coded data D12 under the control of the system control part 26, files this, and stores it in a specified address position in the recording/reproducing part.

Then, each file data (the high-compression coded data D12) recorded in this clip server 33 can be read using each of plural EDL forming devices 34A to 34N connected to the above clip server 33 respectively.

Practically, when in forming EDL, if a read command of a desired file is entered by an operator, each of the EDL forming devices 34A to 34N accesses to the system control part 26 sequentially via the clip server 33 and the LAN 27 and controls the clip server 33 via the above system control part 26, so that the high-compression coded data D12 of a file corresponding to the above clip server 33 is sequentially read out.

Furthermore, the EDL forming devices 34A to 34N decode the high-compressively coded data D20 read out from this clip server 33 and monitor-display pictures based on the obtained AV data.

At this time, the operator controls the clip server 33 via the EDL forming devices 34A to 34N so that a desired operation (reproducing, reviewing or fast-forwarding, etc.) is executed by the above clip server 33. Moreover, at this time, an EDL can be forming so that various information necessary for the edition of an in point and an out point or the like is supplied to the above EDL forming devices 34A to 34N while viewing and confirming pictures displayed on the monitors of the above EDL forming devices 34A to 34N.

Furthermore, the EDL forming devices 34A to 34N can read corresponding high-compression coded data D20 from the clip server 33 based on the formed EDL, decode this, process and edit thus obtained AV data based on the EDL, and monitor-display the edited result, so that the edited result based on the formed EDL can be confirmed by the operator or the like.

Then, the EDL data formed by the EDL forming devices 34A to 34N (hereinafter, this is referred to as EDL data) is transferred from the above EDL forming devices 34A to 34N to the system control part 26 sequentially via the clip server 33 and the LAN 27, and is registered to an external memory device 35 as a database under the control of the above system control part 26.

On the other hand, in the on-air list forming system 23, various data such as on-air list or the like is stored. The system 23 is composed of the external memory device 37 used as a database, a database management device 36 for managing the data stored in the external memory device 37, and plural personal computers 39A to 39N connected to the database management device 36 via a network 38, and an on-air list or an original of each news term which is to be read by an announcer in each news program or the like can be formed using these personal computers 39A to 39N.

Then, thus formed each data of on-air list and original is registered as a database in the external memory device 37 under the control of the database management device 36, and at the same time, data about on-air list (hereinafter, this is referred to as on-air list data) is supplied to the system control part 26 via the LAN 27, and this is registered to the external memory device 35 as a database.

Then, the system control part 26 controls an on-line edition output system 24 based on the EDL data and the on-air list data registered in this external memory device 35.

That is, practically, the system control part 26 always monitors the operating state of EDL executing devices 40A to 40C each of which is composed of a daily server 30 in the on-line edition output system 24 and plural editing devices connected thereto, and if one of the EDL executing devices 40A to 40C completes an editing processing the system control part 26 reads EDL data according to priority stored in the external memory device 35 which is earlier in on-air based on the on-air list data and transmitting this to the one of EDL executing devices 40A to 40C via the LAN 27.

The EDL executing devices 40A to 40C control the daily server 30 based on the EDL data supplied from the system control part 26, and sequentially read necessary AV data D10 from not-compressed or lowly-compressed AV data D10 stored in the above daily server 30. Furthermore, if this AV data D10 is low-compressed, the EDL executing devices 40A to 40C decode this, and then process and edit this AV data D10 into the specified state based on the supplied EDL data, and transmit thus obtained AV data D13A to D13C to an on-air server 41 respectively.

Note that, to the daily server 30, also a manual editing device 42 is connected, thus the operator also can read the AV data D10 stored in the daily server 30 and process/edit it using the above editing device 42. Then, thus obtained edited AV data D13D is transmitted to the on-air server 41.

The on-air server 41 has a recording/reproducing part for recording or reproducing the edited AV data D13A to D13D on/from a non-linear accessible recording medium such as an HDD, MO or the like, and the inputted AV data D13A to D13D is sequentially taken in under the control of the system control part 26, filed, and stored in the specified address position in the recording medium.

Thereafter, each file data recorded in this on-air server 41 (the edited AV data D13A to D13D) of output time is managed by an on-air terminal 49 which is connected to the LAN 27 based on the on-air list data stored in the external memory device 35, and as it comes to the specified time, it is read from the on-air server 41 under the control of the system control part 26, transmitted to an on-air device at the following stage which is not shown, so that a picture material and an audio material, etc., to be broadcasted in a news program is transmitted.

In this manner, in this news program producing and broadcasting system 20, an editing processing is executed using not-compressed or lowly-compressed AV data D10 in the on-line edition output system 24 based on the EDL formed in the off-line EDL forming system 22, and the obtained AV data D13A to D13D can be transmitted to the on-air device based on the on-air list, thereby, news pictures and audio elements edited in the specified state can be broadcasted at the specified time.

In addition to the above structure, in the case of this news program producing and broadcasting system 20, the on-line edition output system 24 is equipped with a near line server 43 which has a recording/reproducing part for recording and/or reproducing AV data to/from a low-cost recording medium having a large storage capacity such as, e.g., a magnet optical (MO) changer or a cassette autochanger, etc., and the AV data D10 and D13A–D13D stored in the daily server 30 and the on-air server 41 are transferred to the near line server 43 under the control of the system control part 26, and this can be stored in the above near line server 43.

Furthermore, the AV data D10 and D13A–D13D stored in the near line server 43 can be transferred to and stored in the above daily server 30 under the control of the system control part 26, so that the storage capacity in the input stage of the on-line edition output system 24 can be increased without increasing the storage capacity of the daily server 30 using plural high-cost nonlinear accessible recording mediums.

Furthermore, the near line server 43 is connected to a cassette autochanger 44 in the archive 25 via a prescribed interface such as a small computer system interface (SCSI) or the like, and it transfers the AV data D10 and D13A–D13D stored in the near line server 43 to the cassette autochanger 44 in the archive 25 under control of the system control part 26, so that the above AV data D10 and D13A–D13D can be recorded to a prescribed recording medium such as a magnetic tape or the like via the cassette autochanger 44. Thereby, in this news program producing and broadcasting system 20, necessary AV data can be saved as a material.

At this time, various management data of the contents of that AV data D1O and D13A–D13D is supplied to a database managing device 45 installed in the archive 25 from the system control part 26 via the LAN 27. Then, this various management data is supplied to the external memory device 46 and saved as a database under the control of the database managing device 45.

Furthermore, at this time, original data corresponding to that AV data can be transferred to the database managing device 45 of the archive 25 from the database managing device 36 in the on-air list forming system 23 via the LAN 27 under the control of the system control part 26, and further this can be registered in the database in the external memory device 46 under the control of the database managing device 45.

Furthermore, the video audio data D10 and D13A–D13D record in the recording medium such as a magnetic tape or the like saved in the archive 25 can be transferred to the input buffer 31 in the off-line EDL forming system 22 and the daily server 30 in the on-line edition output system 24 by reproducing with the cassette autochanger 44, so that the saved AV data D10 and D13A–D13D can be utilized editing again.

Note that, in the case of this news program producing and broadcasting system 20, a filing terminal 47 is connected to the LAN 27 so as to perform the specification of AV data D1O to be taken in by the input buffer 31 and the daily server 30, the input of a file name of thus specified AV data D10, and a confirmation of the contents of AV data D10 recorded in the daily server 30 using the above filing terminal 47.

Furthermore, in the case of this news program producing and broadcasting system 20, also an EDL preview terminal 48 is connected to the LAN 27 so as to read out EDL data stored in the external memory device 35 using the above EDL preview terminal 48, make one of the EDL executing devices 40A to 40C execute editing based on the above EDL data, display the executed result (AV data edited based on the EDL data), thus edited pictures and character data on a monitor connected to that EDL executing devices 40A to 40C and output thus edited audio data from speakers.

Moreover, in the case of this news program producing and broadcasting system 20, desired file data stored in the on-air server 41 (the edited AV data D13A to D13D) can be read using the on-air terminal 49, and pictures and sounds can be outputted from the monitor and speaker or the like connected to the on-air server 41 so that the operator can previously confirm edited news pictures to be actually broadcasted before broadcasting.

(2) Save and Utilization of News Material

In the news program producing and broadcasting system 20 shown in FIG. 2, the AV data D10 by the plural systems taken in the daily server 30 is recorded to the specified address position of the above daily server 30 as a recording material respectively.

These recording materials (the AV data D10) recorded in the daily server 30 are edited by the EDL executing devices 40A, 40B and 40C, and the edited results are transmitted to the on-air server 41 as output materials (the AV data D13A to D13C) respectively.

Here, the daily server 30 records a recording material transferred from the scene to collect materials via a transmission line such as a telephone line or a satellite line or the like, and a recording material obtained by reproducing a material tape by a video tape recorder at each time. This daily server 30 has a capacity capable of recording a recording material for few days. Thus, recording material which has the highest using frequency at the day of recording, and then its using frequency extremely lowers from the day of recording few days to one week later is recorded in a few-days with the daily server 30.

Here, the operator can transfer a prescribed recording material from plural recording materials recorded in the daily server 30 to the near line server 43, for example, by operating the system control part 26.

Figure 3:
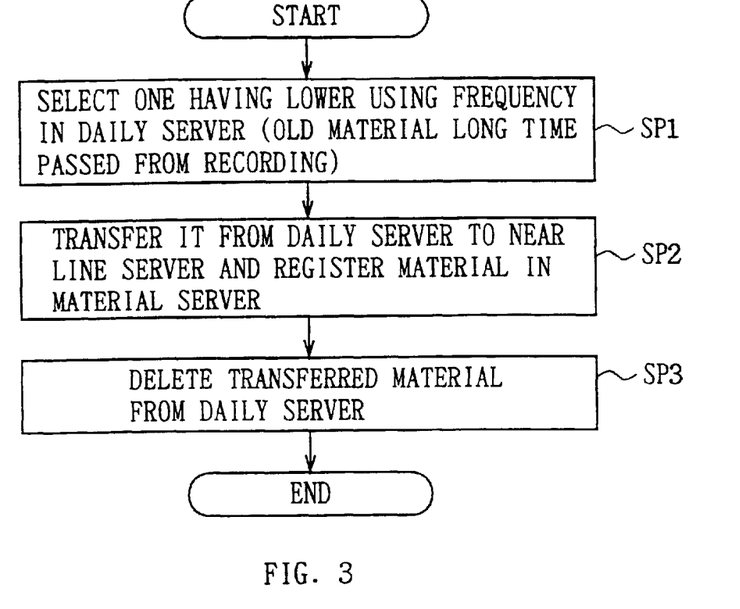
FIG. 3 is a flowchart showing a transferring processing procedure of recording material from a daily server to a near line server.

This transmitting processing for transferring a recording material to the near line server 43 will be described with reference to FIG. 3. FIG. 3 is a flowchart showing the processing procedure for transferring a recording material in the daily server 30 to the near line server 43. When this processing is started, the processing goes to step SP1. In step SP1, the operator selects one having a lower using frequency from among recording materials recorded in the daily server 30 for every predetermined timings (e.g., every day). Here, as the decision reference to the using frequency, for example, the passed number of dates from the recorded day and time are utilized as decision references in addition to the actually used frequency, and one in which a long time has passed is defined as a recording material having a low using frequency. The actually used frequency means the number of times that the recording material has transferred from the daily server 30 to the on-air server 41, the number of times that the recording material recorded in the daily server 30 has been edited by the EDL forming devices 34A to 34N or the number of times the EDL has formed, and so on. By counting these number of times in a certain period, the using frequency is calculated.

As the above, the recording material selected in step SP1 which has a low using frequency is transferred from the daily server 30 to the near line server 43 and recorded therein when the operate selects it or at the time of every predetermined transfer timings (step SP2). Then, in step SP3, the recording material already recorded in near line server 43 is deleted at the daily server 30, and a free capacity is formed in the capacity of the daily server 30.

Here, constructions of the daily server 30 and the near line server 43 will be described.

Figure 4A:
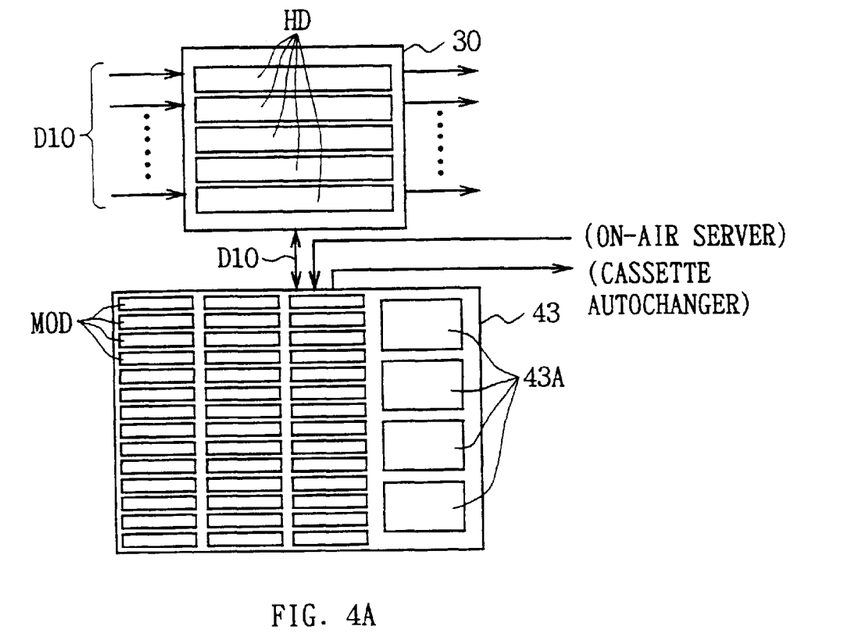
FIGS. 4A and 4B are schematic connection diagrams showing the daily server and near line server.
Figure 4B:
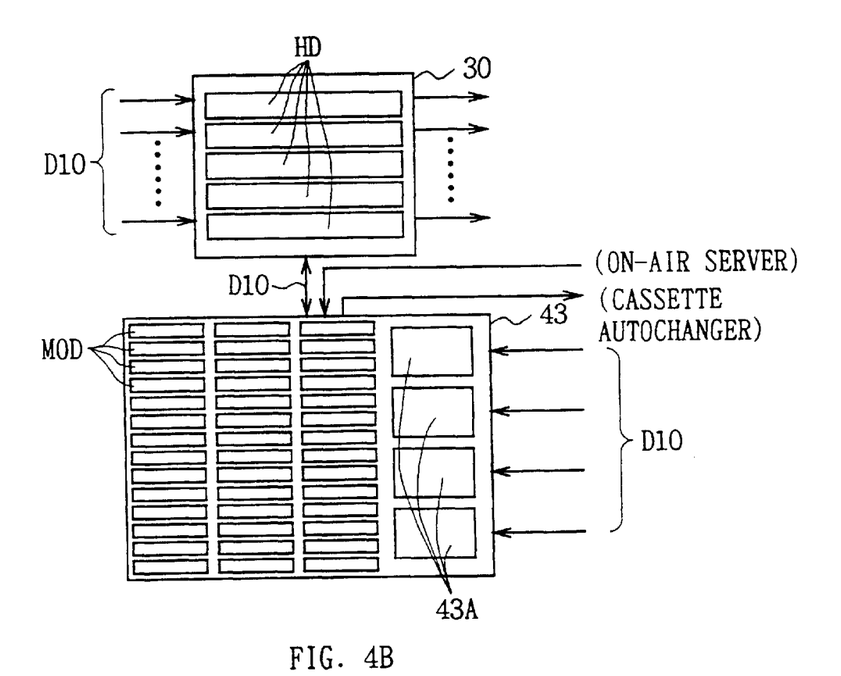
Figure 5:
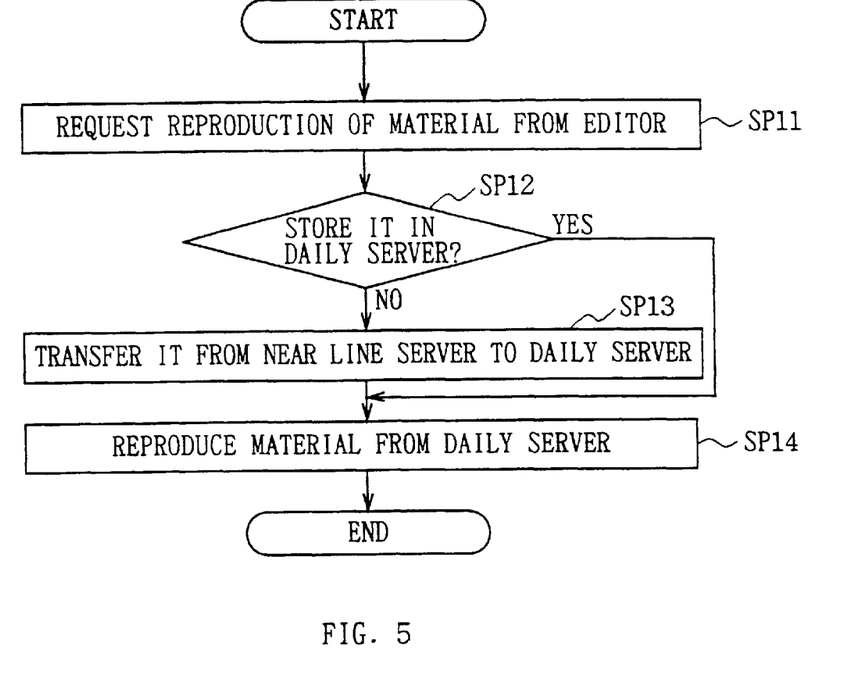
FIG. 5 is a flowchart showing a reproducing processing procedure of recording material.

As shown in FIGS. 4A and 4B, the daily server 30 is formed in an array structure composed of plural nonlinear accessible hard-disk drives (HDDs). Furthermore, it has a recording/reproducing part for recording and/or reproducing inputted AV data to/from the HDD of the daily server 30, and in this recording/reproducing part, the AV data D10 can process plural channels of the AV data D10, so that plural AV data D10 can be inputted and/or outputted to this daily server, as shown in FIGS. 4A and 4B.

Moreover, the near line server 43 realizes mass storage capacity at a low cost by using plural MOs or tape cassettes as recording mediums. Furthermore, the near line server 43 has a recording/reproducing device 43A so as to record/ reproduce the AV data D10 or the like to/from the tape cassettes.

Furthermore, as shown in FIGS. 2A and 4A, the inputted AV data D10 may be recorded to the recording mediums such as MOs or tape cassettes by inputting to the near line server 43. In this case, since the near line server 43 has more storage capacity than the daily server 30, it can be considered also that a necessary material is selected by the editing devices 34A to 34N connected via the network 27 and the selected material is transmitted to the daily server 30. That is, it makes the near line server 43 having the higher storage capacity record a material as a first server, the selected material is recorded to the daily server 30 as a second server from the near line server 43, furthermore, the material from the daily server 30 is recorded to the on-line server 41 as a third server having the least storage capacity, and a necessary material for making a program is broadcasted.

As shown in FIGS. 4A and 4B, the daily server 30 and the near line server 43 can mutually transmit/receive the recording material (AV data D10) as it is; it is not restored to video audio signals. Thereby, the near line server 43 records the AV data D10 being the recording material supplied from the daily server 30 using one of the MO disks MODs or one of the recording/reproducing devices 43A. Information on the MO disk MOD in which the AV data D10 is recorded the recording area of this MO disk MOD, and the tape cassette in which the AV data D10 is recorded, or the like, are managed by the system control part 26.

Furthermore, if a reproducing request is supplied from the system control part 26 to the recorded AV data D10, the near line server 43 searches for the MO disk MOD or the tape cassette in which the AV data D10 is recorded responding to the reproducing request, reproduces the recorded AV data D10 using the data recording/reproducing device 43A or the like, and transfers it to the daily server 30. At this time, the AV data D10 reproduced by the recording/reproducing device 43A or the AV data reproduced from the MO disk is transferred to the daily server 30 as data it is, without it being restored to video audio signals. Thus, the recording/reproducing device 43A may be in a simple structure without having a picture signal output part and an audio signal output part, and a reproducing speed of data is not especially prescribed.

Here, the processing for reproducing a recording material from the daily server 30 will be described with reference to FIG. 3. If the reproducing processing of a recorded material is started, the processing proceeds to step SP11 to wait for a reproducing request of recording materials from EDL executing devices 40A, 40B and 40C to system control part 26. After instructing the reproducing of the recording materials corresponding to the request, the system control part 26 goes to step SP12 to determine whether or not a corresponding recording material is stored in the daily server 30. Here, if an affirmative result is obtained, this means that the corresponding recording material is in the state where it is stored in the daily server 30 and the recording material is immediately usable. At this time, the system control part 26 goes to step SP14 to immediately give the allowance of using the recording material to the EDL executing devices 40A, 40B and 40C and the daily server 30 starts reproducing the recording material.

On the contrary, if the recording material requested for reproducing is not stored in the daily server 30 in step SP12 (if it is NO), this means that the corresponding recording material has already transferred from the daily server 30 to the near line server 43 and is not remaining in the daily server 30. Thus, at this time, the system control part 26 goes to step SP13 to transfer the recording material from the near line server 43 to the daily server 30, and then, it goes to step SP14 to give the allowance of using the recording material to the EDL executing devices 40A, 40B and 40C well as the daily server 30 starts reproducing the recording material.

In this connection, the news program producing and broadcasting system 20 (FIG. 2) has the off-line EDL forming system 22 in which a recording material (AV data D10) is highly compressed and recorded therein, and has the on-line edition output system 24 in which a recording material (AV data D10) is not compressed or lowly compressed and recorded therein, and forms the EDL data by specifying editing points or the like while decoding the recording material highly-compressed in the off-line EDL forming system 22 as an occasion demands, as described above.

Therefore, as for a recording material which is used when the EDL data is formed, the system control 26 confirms whether or not the recording material exists in the daily server 30 in the on-line edition output system 24. At this time, if a corresponding recording material is not remained in the daily server 30, the system control part 26 judges that the recording material has already transferred from the daily server 30 to the near line server 43, and immediately transfers this from the near line server 43 to the daily server 30. Thereby, the recording material used to form the EDL data in the off-line EDL forming system 22 is transferred from the near line server 43 to the daily server 30 when the EDL data is formed, and after the completion of the EDL data forming, when the actual editing operation is started in the on-line edition output system 24 based on this EDL data, the recording material has already transferred to the daily server 30, and thus, the recording material is to be immediately usable.

Thus, even if a recording material is saved using the near line server 43 which requires a more access time than the daily server 30, the recording material is to be immediately usable when the actual editing operation is performed, so that recording and reproducing of a recording material can be performed as if the capacity of the daily server 30 having a fixed disk device structure is increased.

Moreover, in this case, a recording material having a high using frequency which has just recorded is stored in the daily server 30 of a fixed disk device (hard disk device) structure capable of performing data access for a short time, and a recording material having a low using frequency which has been passed for few days from its recording is saved in the near line server 43 formed by an MO disk changer or a cassette autochanger having a large capacity at a low cost although relatively requiring a more time than the daily server 30. Thereby, the complicated operation in which a recording material is outputted after once transferred from the near line server 43 to the daily server 30 can be reduced.

Here, among recording materials recorded in the near line server 43, once a few months to one year has been passed from its recording and a using frequency is extremely reduced, it is sequentially transmitted to the cassette autochanger 44 of the archive 25, and is recorded to a magnetic tape or the like. When a recording material on a magnetic tape saved in the archive 25 is used, the cassette autochanger 44 is controlled by the system control part 26, a video cassette in which a corresponding recording material is recorded is selected, and the recording material is reproduced from the magnetic tape of the video cassette. This recording material is transferred to the input buffer 31 in the off-line EDL forming system 22 and the daily server 30 in the on-line edition output system 24.

As in the above, since a recording material having a high using frequency is stored in the daily server 30, a recording material having a lower using frequency than the recording material in the daily server 30 is saved in the near line server 43, and a recording material having a lower using frequency than the recording material in the near line server 43 is stored in the archive 25, the recording material having a high using frequency is made immediately usable by the daily server 30 with a short access time, and the recording material having a low using frequency saved in the near line server 43 which has a large recording capacity although it requires a more access time than the daily server 30 is made usable by being transferred to the daily server 30 as an occasion demands. And the recording material having an extremely low using frequency saved in the archive 25 is made transmittable to the off-line EDL forming system 22 and the on-line edition output system 24 as an occasion demands. Thereby, as for the recording material saved in the archive 25, when this is not used, it may be deleted in both the off-line EDL forming system 22 and the on-line edition output system 24, and read from the archive 25 and recorded again as an occasion demands.

In the above structure, the recording material having a high using frequency stored in the daily server 30 is immediately read out responding to a using request from one of the EDL executing devices 40A, 40B and 40C, and supplied to this EDL executing device 40A, 40B or 40C. On the other hand, the utilization of the recording material having a low using frequency saved in the near line server 43 is decided when EDL data is formed in the off-line EDL forming system 22, and the recording material is transferred from the near line server 43 to the daily server 30.

Thus, when the EDL executing devices 40A, 40B and 40C execute an editing operation, a necessary recording material is always read out from the daily server 30, so that each of the EDL executing devices 40A, 40B and 40C can read out and use all using recording materials from the daily server 30 formed by a nonlinear accessible recording medium, and thus, an editing operation of news program requiring promptness can be performed for a short time.

The on-line edition output system 24 for recording a recording material just as it is not compressed and lowly compressed can record the recording material as if the capacity of the daily server 30 is increased using the daily server 30 and the near line server 43 because the data amount of recording materials increases.

According to the above structure, since the recording material is read out from the daily server 30, a processing or an editing of the recording material can be facilitated. And since the near line server 43 having a mass capacity is used as the saving medium of recording materials in addition to the daily server 30, a recording amount of recording materials can be noticeably increased. Thereby, the daily server 30 can increase its recording amount relatively at a low cost as in that the advantageous of easy processing and editing of materials or the sharing of files are kept.

Furthermore, in the news program producing and broadcasting system 20 in which a recording material is highly compressed and saved in the off-line EDL forming system 22 while a recording material that is not compressed or lowly compressed is saved in the on-line edition output system 24, since the high-speed access characteristic is kept without increasing the capacity of the daily server 30 having a high access frequency as well as a storage capacity is maintained by the near line server 43, the recording capacity can be increased while maintaining the accessibility to a recording material in the whole of the saving means (the daily server 30, near line server 43 and archive 25) of a recording material in the on-line edition output system 24.

(3) Other Embodiments

The above embodiment has dealt with the case where in the off-line EDL forming system, when using a recording material saved in the near line server 43, the recording material is previously transferred to the daily server 30 before starting an editing work. However, the present invention is not only limited to this but if a using request is outputted from one of the EDL executing devices 40A, 40B and 40C for executing editing, a recording material saved in the recording material 43 side may be transferred to the daily server 30 to be used among recording materials corresponding to this using request.

Also in this case, since the recording materials having a high using frequency are stored in the daily server 30 and the recording materials having a low using frequency are saved in the near line server 43, when an editing work is performed in the whole recording material recording means including the daily server 30 and the near line server 43, an access speed to a necessary recording material can be increased to a sufficient degree in practical use.

Figure 6:
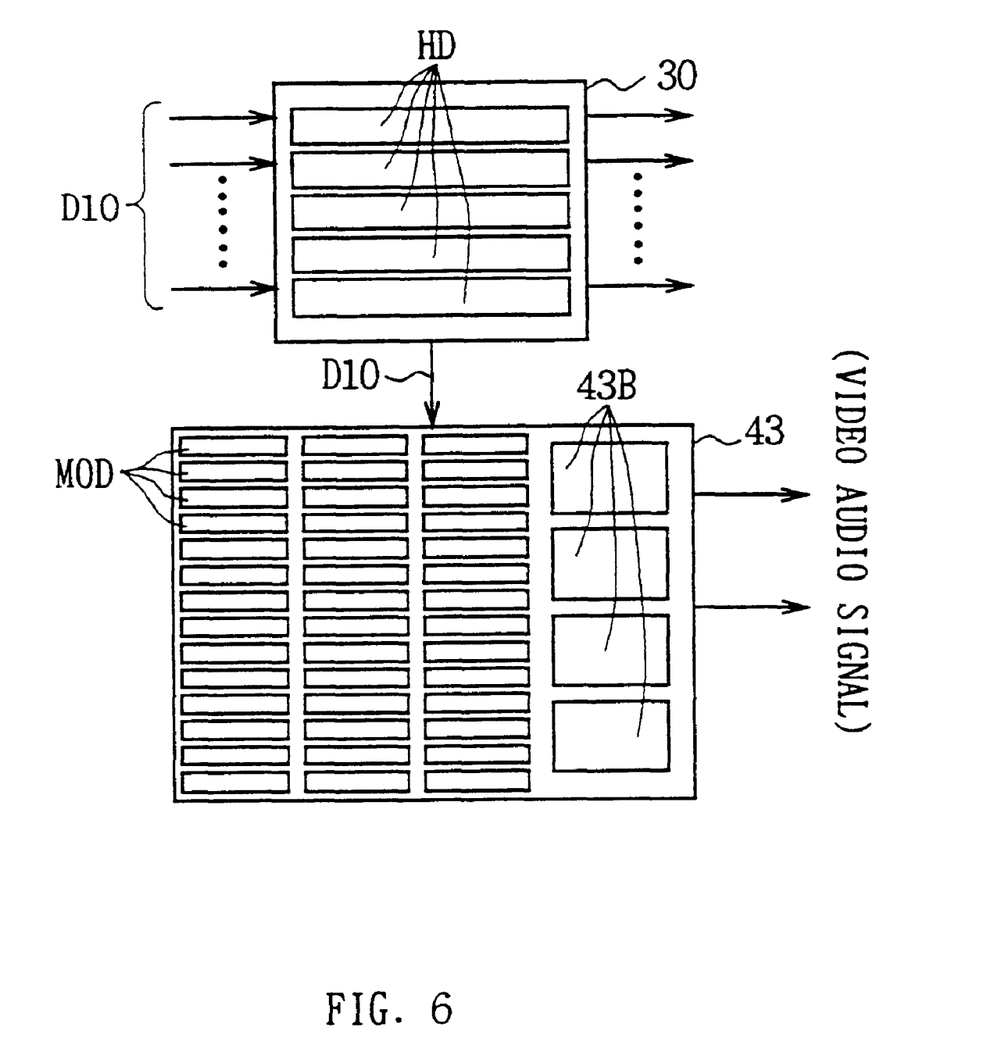
FIG. 6 is a schematic connection diagram showing a daily server and a near line server according to another embodiment.

The above embodiment has dealt with the case where a transmitting/receiving of recording material between the daily server 30 and the near line server 43 is performed as it is in a data form not decoded into a video audio signal. However, the present invention is not only limited to this but also, for example, as shown in FIG. 6, a near line server 43 may be provided with a reproducing device 43B for decoding AV data D10 into a video audio signal and a video audio output terminal corresponding to this to output decoded video audio signal to the EDL executing devices 40A, 40B and 40C or the like.

The above embodiment has dealt with the case where the MO disk changer is utilized as the near line server 43. However, the present invention is not only limited to this but also a changer having another recording medium such as a tape cassette changer or the like may be provided.

The above embodiment has dealt with the case where the MO disk changer is utilized as the near line server 43. However, the present invention is not only limited to this but also, for example, it may be formed by a hard-disk device or a hard-disk array having less number of simultaneous inputs/outputs.

The above embodiment has dealt with the case where the hard-disk drive is utilized as a recording medium for the daily server 30. However, the present invention is not only limited to this but also other various recording means can be applied using a semiconductor memory or the like, for example.

The above embodiment has dealt with the case where after a recording material is once recorded to the daily server 30, one having a low using frequency is transferred to the near line server 43. However, the present invention is not only limited to this but also in the case where the above recording material of using frequency is low and known at the time of recording the recording material to the daily server 30, this recording material may be directly saved in the near line server 43 without recording to the daily server 30.

The above embodiment has dealt with the case where after a recording material is once recorded to the daily server 30, one having a low using frequency is transferred to the near line server 43. However, the present invention is not only limited to this but also when the recording material is recorded to the daily server 30, it may be saved in the near line server 43 at the same time to be recorded to both the daily server 30 and the near line server 43. Thereby, the near line server 43 can be utilized to backup the daily server 30.

Note that, in this case, a recording material in the daily server 30 is deleted corresponding to a time passed from the recorded time and a recording material on the near line server 43 side is saved as it is, so that a backup of recording materials having a high using frequency can be performed in the near line server 43 and recording materials having a low using frequency can be saved in the near line server 43 without remarkably increasing the capacity of this daily server 30.

The above embodiment has dealt with the case where the capacity of the daily server 30 is defined as that which is capable of storing recording materials for several days, the recording material is transferred to the near line server 43 at a timing corresponding to this, and the recording materials saved in the near line server 43 are transferred to the archive 25 after several months—one year passed. However, the transfer timing is not only limited to this but also various timings may be applied corresponding to the capacity of each server.

Furthermore, this case has dealt with the case where the recording material to be transferred from the daily server 30 to the near line server 43 is specified every day by the operator. However, the present invention is not only limited to this but also it can be specified at various timings.

The above embodiment has dealt with the case where the recording material having a low using frequency is specified by the operator from among the recording materials in the daily server 30. However, the present invention is not only limited to this but also, for example, the operator may previously specify a recording material having a high using frequency irrespective of a passed time from the recorded time from among the recording materials in the daily server 30, and the system control unit 26 may automatically transfer a recording material other than the specified material according to the passed time from its recorded time. Thereby, since material other than the recording material needed by the operator is automatically transferred to the near line server 43 according to its using frequency, the operator's work can be further simplified.

The above embodiment has dealt with the case where a fixed passed time is utilized as a reference to decide its using frequency. However, the present invention is not only limited to this but also, for example, the operator may previously rank a news value to recording materials, and it may be transferred to the near line server 43 after a passed time corresponding to this rank.

The above embodiment has dealt with the case where the recording materials in the near line server 43 are data-transferred to the archive 25 according to their using frequency. However, the present invention is not only limited to this but also an MO disk MOD in the near line server 43 may be stored in a predetermined file that is hands-on.

The above embodiment has dealt with the case where the present invention is applied to the news program producing and broadcasting system 20 having the off-line EDL forming system 22 and the on-line edition output system 24, each of them having the same recording material data. However, the present invention is not only limited to this but also, for example, it is widely applicable to a system such as, for example, an editing system having only the on-line edition output system 24, etc., in short, one for saving plural materials and using them as occasion demands.

In the above embodiment, it has been described that data to be inputted is video and/or audio data, however, character data or various data (or a combination of video, audio, chapter and other data) can be considered other than that, and also these are applicable to a news program producing and broadcasting system according to the present invention. Moreover, data to be inputted to the news program producing and broadcasting system of the present invention is inputted according to the transfer formats such as the SDI (serial data interface: it is standardized by SMPTE-259n) and the SDDI (serial digital data interface) which are standardized to transmit video audio signals in a station, further the ATM (asynchronous transfer mode) or a fiber channel, etc., as asynchronous system transfer.

According to the present invention, in a signal processing unit having a high-compression system processing means for highly compressing signals including video signals and saving them and a low-compression system processing means for not compressing or lowly compressing the signals including the video signals and saving them, the low-compression system processing means is provided with a first memory means for storing the signal including the video signal and a second memory means for storing the signal including the video signal having a lower using frequency than the first memory means. The storage capacity can be increased for the entire low-compression system memory means including the first memory means and the second memory means without increasing the storage capacity of the first memory means for storing the signal including the video signal having a high using frequency. Thus, an access to the first memory means for storing the signal including the video signal having a high using frequency can be facilitated.

A signal processing unit according to the present invention is utilizable for a news program producing and broadcasting system for producing a news program by processing and editing a news material obtained by covering, in a broadcasting station.

What is claimed is:

1. A signal processing unit comprising:

high-compression system processing means for high compression of signals including video signals and for saving said signals; and low-compressing system processing means for performing one of omitting compression and low compression of said signals including said video signals and for saving said signals, said low-compression system processing means including:

first memory means for storing said signals including said video signals; and second memory means for storing said signals including said video signals having a lower frequency of use than said signals stored in said first memory means, wherein said signals are transferred from said first memory means to said second memory means based on a frequency of use.

2. The signal processing unit according to claim 1, wherein said first memory means has a faster access speed for accessing stored signals including picture signals than an access speed of said second memory means.

3. A signal processing unit comprising high-compression processing means for high compression of input signals including video signals and for processing said input signals, and low-compression processing means for performing one of omitting compression and low compression of said input signals including said video signals and for processing said input signals, wherein:

said high-compression processing means includes:

first memory means for storing said input signals including highly-compressed video signals; and list forming means for editing said input signals stored in said first memory means and for forming lists showing executing sequences of edited signals;

said low-compression processing means includes:

second memory means for storing said input signals including uncompressed video signals and lowly-compressed video signals;

list executing means for outputting said input signals stored in said second memory means based on said lists formed by said list forming means;

third memory means for storing said input signals outputted based on output sequence lists from said list executing means; and fourth memory means for storing said input signals stored in said second memory means according to a frequency of use for said input signals stored in said second memory means, wherein said input signals stored in said third memory means are outputted.

4. The signal processing unit according to claim 3, further comprising output sequence list forming means for forming output sequence lists showing output sequences of said input signals stored in said third memory means, and wherein said input signals stored in said third memory means are outputted from said third memory means based on said output sequence lists.

5. The signal processing unit according to claim 3, wherein:
 said input signals stored in said third memory means are outputted to said fourth memory means according to frequencies of use that are outputted from said third memory means; and
 said fourth memory means stores said input signals outputted from said third memory means.

6. The signal processing unit according to claim 3, wherein said fourth memory means stores said input signals including said video signals and outputs stored signals to said second memory means responding to editing requests from said list forming means.

* * * * *